Feb. 24, 1953 W. E. BOSCHIN 2,629,509
CONTAINER ADAPTED TO BE VACUUM SEALED
Filed Oct. 10, 1950 2 SHEETS—SHEET 2
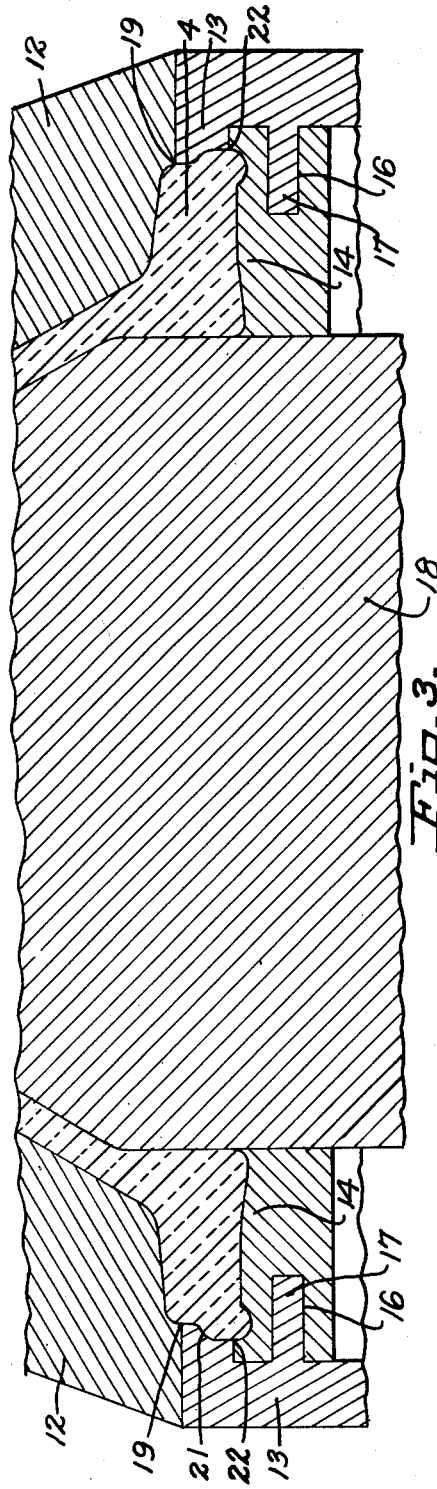
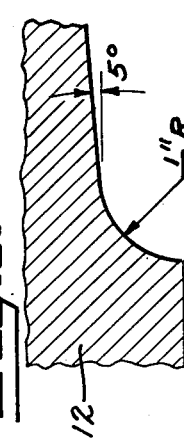
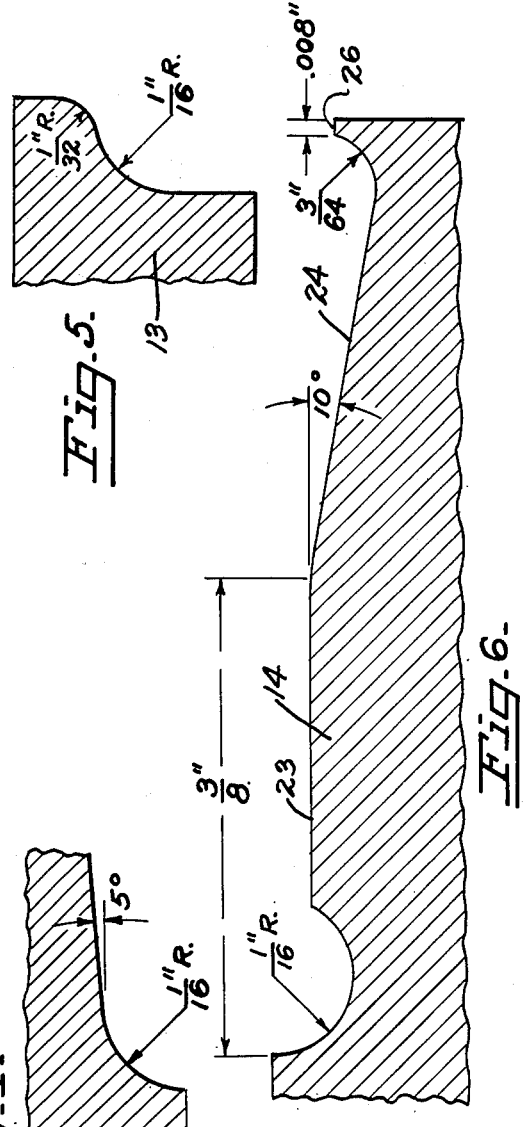
INVENTOR.
WALTER E. BOSCHIN
BY Charles M. Fryer
ATTORNEY Patented Feb. 24, 1953

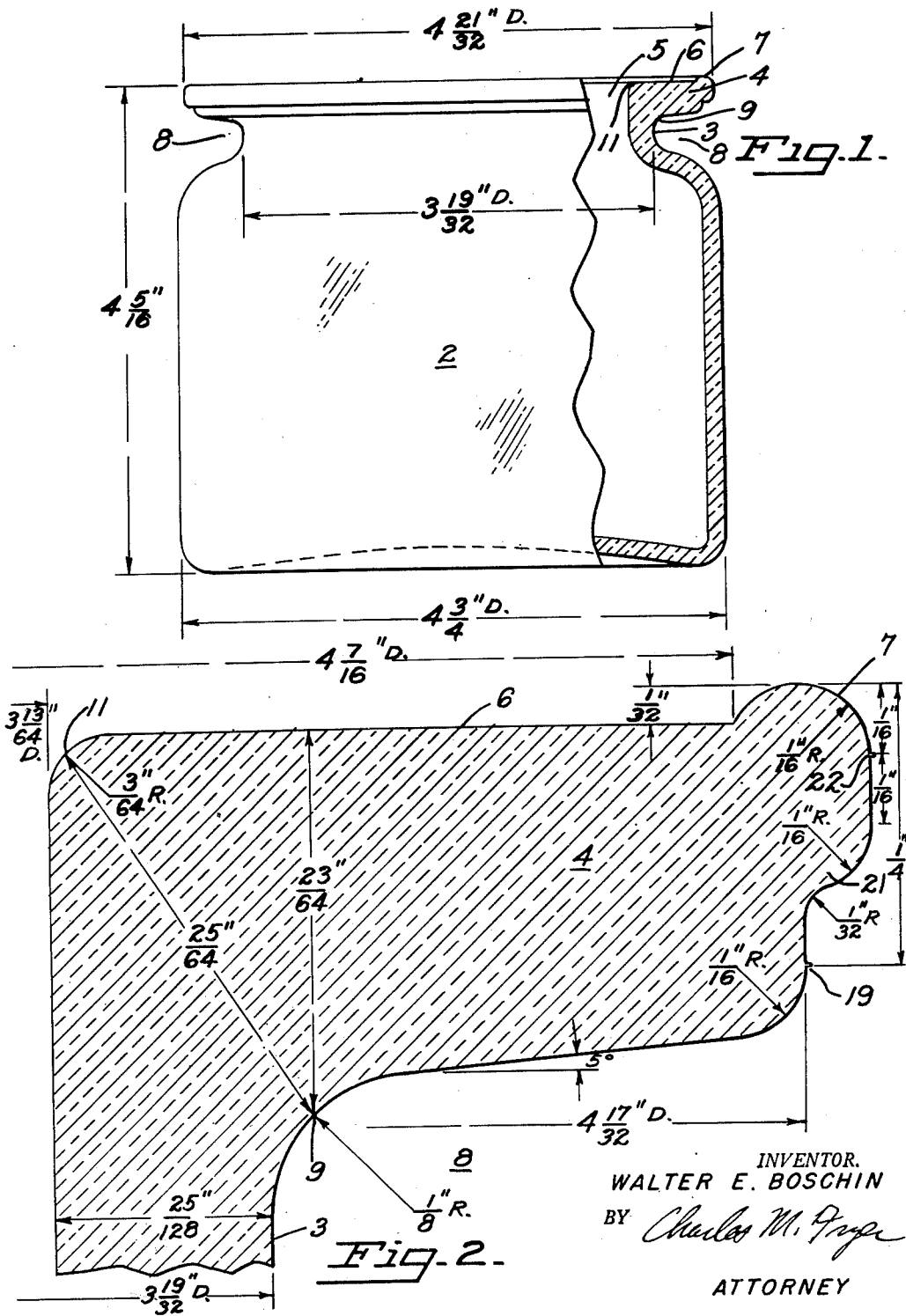

2,629,509

UNITED STATES PATENT OFFICE 2,629,509

CONTAINER ADAPTED TO BE VACUUM SEALED

Walter E. Boschin, San Francisco, Calif., assignor to Glass Containers, Inc., San Francisco, Calif., a corporation of California Application October 10, 1950, Serial No. 189,419

9 Claims. (Cl. 215—31)

This invention relates to a container of glass or the like material which has a flat surfaced rim on the top of its finish which is adapted to be vacuum sealed by a type of closure having a suction channel of resilient material, and more particularly to the finish and neck construction of such container.

A container of that type is disclosed in United States Patent No. 2,212,804, to Wynings, dated August 27, 1940. In the manufacture of such container, it is important for efficacious sealing thereof by the closure having the resilient suction channel, that the sealing surface on the rim of the container be truly substantially flat, and also relatively wide so that both of the two flanges of the channel when pressed down to seal the container will engage such flat surface.

This sealing surface should be not much less than ½ inch wide. A surface of this width made truly flat presents a problem in the manufacture thereof by automatic glass container making machines, because after the container is completely formed and allowed to cool, change in dimensions of the glass upon cooling results in sufficient distortion to cause warping of the intended flat sealing surface which must necessarily be molded while the glass is heated. A subsequent grinding operation could be employed on each individual container to render the sealing surface truly flat but such operation would increase costs to such extent as to render the manufacture of the containers commercially impractical.

Summarizing this invention, it comprises providing a finish and neck on a container of the type described which are of such construction as to minimize distortion of the flat sealing surface on the rim of the container. This is accomplished by providing a relatively deep groove about the neck of the container, so that the diagonal thickness of the finish between the junction of the neck with the finish of the container and the inner edge of the rim of the container is not materially in excess of the thickness of the finish between such junction and the flat sealing surface; such diagonal thickness being only slightly greater.

The provision of such relatively deep neck-groove presents a problem in the manufacture of the container by a common type of automatic glass container making machinery, such as those of the type disclosed in United States Patents Nos. 1,911,119; 1,948,218; and 1,948,219 because the neck ring mold in such type of machine does not open wide enough to allow the rim of the container to drop through the neck ring when the mold parting seam between the parison and the neck ring molds is located at the usual place on the neck of the container. Secondly, with a relatively deep neck-groove, even if the neck ring could open wide enough, the resultant containers will generally "check," resulting in defective containers, because the opening of the neck ring along relatively long surfaces creates a pulling effect along the heated glass causing the "checking."

In this invention, such problem is obviated by provision of the mold parting seam arrangement on the finish of the container itself rather than on the neck of the container; the latter being the arrangement employed on glass jars, bottles and similar containers prior to this invention. To enable the container to be handled when it is transferred by the neck ring to the blow mold, a shoulder is provided about the periphery of the finish. From the preceding, it is seen that the invention has as its objects, among others, the provision of an improved neck and finish construction on a container of the type described which will provide a truly flat sealing surface on the finish, and which can be manufactured with conventional glass container making machinery, thus making for economy, and to the provision of a simple and economical method for accomplishing these purposes. Other objects of the invention will become apparent from the following description.

Referring to the drawings:

Fig. 1 is an elevational view, partly in section to illustrate more clearly the construction, of a form of wide-mouthed glass container of this invention; the structure being drawn to actual scale;

Fig. 2 is an enlarged fragmentary sectional view, 10 times full scale, of the finish and neck structure of the container;

Fig. 3 is a schematic longitudinal sectional view illustrating the arrangement of various mold elements for formation of the finish and neck of the container;

Fig. 4 is a fragmentary sectional view, 10 times full scale, illustrating the contour of the portion of the parison mold for forming a portion of the side of the finish, and also the underside of the finish which corresponds to the upper side of the neck-groove of the container;

Fig. 5 is a similar view, on the same scale as Fig. 4, of the contour of the portion of the neck ring mold for forming the major portion of the side of the finish;

Fig. 6 is another similar view, on the same scale as Figs. 4 and 5, of the portion of the guide and top finish ring mold for forming the upper surface of the finish and a peripheral upstanding flange on the rim.

As is illustrated in Fig. 1, the container comprises body 2, neck 3 joined to the body, and finish 4 joined to the neck; the container being provided with a relatively wide mouth 5 to allow ready insertion of contents to be placed therein. In this connection, the described type of container and closure therefor are particularly adapted for repeated use in the storage of leftover food products in a refrigerator, so that they will remain relatively fresh over relatively long periods of time.

The top of the finish is in the form of a relatively wide rim having the relatively wide flat sealing surface 6 which is adapted to be sealed by a resilient suction channel (not shown) of the type disclosed in the aforementioned Patent No. 2,212,804. This sealing surface should be not much less than ½ inch in width for efficacious sealing by the suction channel; and in the preferred embodiment of this invention as illustrated, the width of the flat sealing surface is approximately $\frac{9}{16}$ inch. The flat sealing surface 6 extends from substantially adjacent the outer peripheral edge of the rim to the inner edge thereof; and a peripheral upstanding flange 7 is provided on the rim adjacent the outer edge thereof for the purpose of centering and guiding the closure when applied to sealing surface 6.

In order to minimize distortion of flat sealing surface 6, neck 3 is formed by the provision of a relatively deep groove 8 in comparison to the width of sealing surface 6, between the finish 4 and body 2 of the container; so that the thickness of the finish along the diagonal between the junction 9 of neck 3 with finish 4 and the inner edge 11 of the rim is only slightly greater than the vertical thickness of the finish between such junction 9 and the flat sealing surface 6. If this diagonal thickness were too great in comparison with the vertical thickness between junction 9 and the sealing surface 6, as is the case with respect to the embodiment of the invention shown in Fig. 2 of the aforementioned Patent No. 2,212,804, distortion of sealing surface 6 will occur upon cooling of the container after molding thereof because of unequal stresses which are set up as a result of such vast difference in the thicknesses.

In order to manufacture the described type of finish and deep-neck groove construction with conventional glass container making machinery, a special mold parting line or seam construction, to be explained more fully hereinafter, is designed on the finish itself. Reference is made to Fig. 3 for an explanation of conventional type of mold elements employed in such machine. As usual and as is disclosed in the aforementioned patents for glass container making machinery, the finish is formed first in inverted position; the usual parison or blank mold 12 being employed. Such mold is conventionally longitudinally split at diametrically opposite points so that it may close and open in a lateral direction to receive the parison of molten glass, and permit removal of the partially molded parison therefrom.

Cooperating with parison mold 12 is a neck ring mold 13 which is split longitudinally along one side to provide two half ring parts which are pivotally connected at the opposite side to enable this mold to be opened by the conventional mechanism provided on the machine. Mounted for floating support on neck ring mold 13 is a plunger guide and top finish ring mold 14, which is not split but which is provided with a peripheral recess 16. An internal flange 17 on neck ring mold 13 slidably engages in recess 16 so as to support guide ring mold 14. The depth of recess 16 and of flange 17 are such that when neck ring mold 13 is opened wide to release the finish, guide ring mold 14 remains supported on neck ring mold 13.

Guide ring mold 14, besides forming the top side of the finish, serves as a guide for the usual plunger 18 which, when the molten parison is dropped into parison mold 12, is automatically inserted through the guide ring 14 and partially into parison mold 12 to force the molten glass into the mold cavities and form the top of the container including the finish. Upon such formation, the plunger is automatically removed, and the machine with the neck ring 13 engaging the finish of the container operates automatically to invert the partially formed container, as is disclosed in the aforementioned patents, and drop the same into a conventional blow mold (not shown) where the remainder of the container is formed. In dropping the partially formed container into the blow mold, neck ring 13 is automatically opened so that the container may be released.

The described mode of operation and general arrangement of the mold elements, as previously mentioned, is conventional. However, in conventional operation, the parting line or seam on the container resulting from the plane of contact between neck ring mold 13 and parison or blank mold 12 has always been placed on the neck of the container. Formation of such seam on the neck of the container hereof is not feasible because of the relatively deep groove 8. This is so because the mechanism on conventional glass making machinery for opening the neck ring mold 13 does not open wide enough, even when fully opened, to permit the neck ring to clear the partially formed container because of the presence of such deep groove. Hence, the partially formed container cannot fall free of the neck ring mold when it is inverted and opened to drop the partially formed container into the blow mold. Furthermore, if the seam in question were located on neck 3, the pull on the hot glass when the neck ring would open along the upper and the lower surfaces of the relatively deep groove 8 would cause the previously mentioned checking.

Consequently, in the method and construction of this invention, the parting line or seam 19 resulting from contact between parison mold 12 and neck ring mold 13, is positioned circumferentially about the periphery of the finish; and a relatively short shoulder 21 is formed on the finish above parting seam 19 to enable transfer or lifting of the partially formed container from the parison mold 12, by neck ring 13. In this connection, it will be noted that the depth of shoulder 21 is such that when the neck ring mold 13 opens, it will clear the same to permit the partially formed container to be free of the neck ring when it is opened.

Another parting line or seam 22 is formed circumferentially about the finish above shoulder 21. This seam results from the engagement between neck ring 13 and guide ring 14; and it as well as seam 19 are both readily observable on the container. The neck ring and the guide ring portions adjacent seam 22 could be so shaped as to place the seam formed thereby on top of upstanding flange 7 but such location is not as desirable as on the periphery of the finish because it would present a rough relatively sharp exposed edge to the person using the container.

From the preceding, it is seen that the lower end of parison mold 12 forms the important portion of the underside of the finish; neck ring 13 forms substantially the complete side of the finish; guide ring 14 forms the top of the finish including upstanding flange 7; and the remainder of the container is formed in the blow mold. In Figs. 4 through 6 the contours of the mold surfaces for formation of the finish and the upper side of groove 8 are shown on the scale of about 10 to 1; dimensions being applied to such mold surfaces.

With respect to the detail of guide ring mold 14 for formation of substantially flat sealing surface 6, it will be noted that the mold surface is substantially flat at 23 for about half the width thereof. A slight inclination 24 (upward with reference to the upright position of the container) of about 10° is preferably provided adjacent the inner edge of this mold surface because it has been found that when the container cools, such inclination formed on surface 6 compensates for change in dimensions of the glass upon cooling to result in the final flat formation of surface 6. The 10° angle of inclination is preferred for the container of the finish dimensions illustrated. However, it is to be understood that this angle may vary depending upon the particular dimensions employed. Furthermore, such inclination may not necessarily start at about ½ the width, as long as the inclination extends toward and adjacent the inner edge of the mold forming surface on the guide ring. A relatively narrow flat 26 is also preferably formed on the mold forming surface adjacent the inner edge of guide ring 14, to avoid possible breaking off of such guide ring edge upon repeated use, which might otherwise occur if it were made sharp. However, such edge may be made relatively sharp, if so desired.

On the enlarged view of Fig. 2, the main dimensions for the commercial embodiment of the container illustrated, are shown; and it will be noted that all corners of the finish are rounded to obviate sharp edges, and facilitate freeing of the mold elements. Also it will be noted that seams 19 and 22 are at the termini of the respective radii of the mold elements effecting their formation, which also facilitates freeing of the mold elements.

In the commercial embodiment of the invention, the same finish dimensions are employed for all sizes of containers; the only change being variations in the depth of body 2 of the container in accordance with the various capacities desired. The dimensions illustrated have been found most satisfactory. However, it is to be understood that they may be varied in accordance with the principles pointed out above as long as the previously mentioned diagonal thickness is not materially in excess and, preferably only slightly greater than the vertical thickness of the finish between the flat sealing surface 6 and the junction 9 between finish 4 and neck 3, and the relatively deep groove 8 is provided to obtain such arrangement.

On the container illustrated, the diagonal thickness between the middle of the arc forming the rounded corner at junction 9 and the middle of the arc forming the rounded inner edge 11 of the rim is approximately 25/64 of an inch, while the vertical thickness between the same point at junction 9 and the flat sealing surface 6 is approximately 23/64 of an inch. If the diagonal thickness is too great relative to such vertical thickness, then the sealing surface 6 will become distorted upon cooling of the container, to such extent as to destroy the flatness of surface 6, while if the diagonal thickness is too thin relative to the vertical thickness, there may be insufficient strength and breakage may occur. For these reasons, the diagonal thickness should be less than 1¾ and greater than ¾ times the vertical thickness in question. Also, groove 8 should be deep enough so that the finish projects beyond neck 3 at least 1¾ but no greater than 4 times the thickness of the neck; the neck thickness being approximately 25/128 of an inch in the embodiment illustrated and the depth of the groove being approximately 2½ times the thickness of the neck.

I claim:

1. A container of glass or the like material of the type having a relatively wide substantially flat surfaced rim about its mouth adapted to be sealed by a closure having a suction channel of resilient material, comprising a body, a neck joined to the body, a finish joined to the neck, the flat surface of the rim being on the top of the finish, a relatively deep groove about said neck in comparison to the width of said flat surface, and a circumferential mold parting seam on said finish.

2. A container of glass or the like material of the type having a relatively wide substantially flat surfaced rim about its mouth adapted to be sealed by a closure having a suction channel of resilient material, comprising a body, a neck joined to the body, a finish joined to the neck, the flat surface of the rim being on the top of the finish and extending to a position adjacent the inner edge of the rim, and a relatively deep groove about said neck to provide a diagonal thickness of the finish between said inner edge of the rim and the junction of said neck with said finish less than 1¾ but greater than ¾ times the thickness of the finish between said junction and said flat surface.

3. A container of glass or the like material of the type having a relatively wide substantially flat surfaced rim about its mouth adapted to be sealed by a closure having a suction channel of resilient material, comprising a body, a neck joined to the body, a finish joined to the neck, the flat surface of the rim being on the top of the finish and extending to a position adjacent the inner edge of the rim, a relatively deep groove about said neck to provide a diagonal thickness of the finish between said inner edge of the rim and the junction of said neck with said finish less than 1¾ but greater than ¾ times the thickness of the finish between said junction and said flat surface, a mold transfer shoulder about the periphery of said finish, a circumferential mold parting seam on said finish below said shoulder, and another circumferential mold parting seam on said finish above said shoulder.

4. A container of glass or the like material of the type having a relatively wide substantially flat surfaced rim about its mouth adapted to be sealed by a closure having a suction channel of resilient material, comprising a body, a neck joined to the body, a finish joined to the neck, the flat surface of the rim being on the top of the finish and extending from substantially adjacent the outer peripheral edge of the rim to the inner edge of the rim, a relatively deep groove about said neck to provide a diagonal thickness of the finish between said inner edge of the rim and the junction of said neck with said finish less than 1¾ but greater than ¾ times the thickness of the finish between said junction and said flat surface, a mold transfer shoulder about the periphery of said finish, a circumferential mold parting seam on said finish below said shoulder, another circumferential mold parting seam on said finish above said shoulder, and a peripheral upstanding flange on said rim adjacent the outer edge thereof.

5. A container of glass or the like material of the type having a relatively wide substantially flat surfaced rim about its mouth adapted to be sealed by a closure having a suction channel of resilient material, comprising a body, a neck joined to the body, a finish joined to the neck, the flat surface of the rim being on the top of the finish and extending to a position adjacent the inner edge of the rim, and a relatively deep groove about said neck to provide a diagonal thickness of the finish between said inner edge of the rim and the junction of said neck with said finish only slightly greater than the thickness of the finish between said junction and said flat surface.

6. A container of glass or the like material of the type having a relatively wide substantially flat surfaced rim about its mouth adapted to be sealed by a closure having a suction channel of resilient material, comprising a body, a neck joined to the body, a finish joined to the neck, the flat surface of the rim being on the top of the finish and extending to a position adjacent the inner edge of the rim, a relatively deep groove about said neck to provide a diagonal thickness of the finish between said inner edge of the rim and the junction of said neck with said finish only slightly greater than the thickness of the finish between said junction and said flat surface, a mold transfer shoulder about the periphery of said finish, a circumferential mold parting seam on said finish below said shoulder, and another circumferential mold parting seam on said finish above said shoulder.

7. A container of glass or the like material of the type having a relatively wide substantially flat surfaced rim about its mouth adapted to be sealed by a closure having a suction channel of resilient material, comprising a body, a neck joined to the body, a finish joined to the neck, the flat surface of the rim being on the top of the finish and extending to a position adjacent the inner edge of the rim, a relatively deep groove about said neck in comparison to the width of said flat surface providing a diagonal thickness of the finish between said inner edge of the rim and the junction of said neck with said finish which is less than 1¾ but greater than ¾ times the thickness of the finish between said junction and said flat surface, the finish projecting beyond said neck a distance at least 1¾ but no greater than 4 times the thickness of the neck.

8. A container of glass or the like material of the type having a relatively wide substantially flat surfaced rim about its mouth adapted to be sealed by a closure having a suction channel of resilient material, comprising a body, a neck joined to the body, a finish joined to the neck, the flat surface of the rim being on the top of the finish and extending to a position adjacent the inner edge of the rim, a relatively deep groove about said neck in comparison to the width of said flat surface providing a diagonal thickness of the finish between said inner edge of the rim and the junction of said neck with said finish which is less than 1¾ but greater than ¾ times the thickness of the finish between said junction and said flat surface, the finish projecting beyond said neck a distance at least 1¾ but no greater than 4 times the thickness of the neck, the upper peripheral portion of said finish adjacent said flat surface being of larger diameter than the remainder of the finish to provide a shoulder about the periphery of the finish.

9. A container of glass or the like material of the type having a relatively wide substantially flat surfaced rim about its mouth adapted to be sealed by a closure having a suction channel of resilient material, comprising a body, a neck joined to the body, a finish joined to the neck, the flat surface of the rim being on the top of the finish and extending to a position adjacent the inner edge of the rim, a relatively deep groove about said neck in comparison to the width of said flat surface providing a diagonal thickness of the finish between said inner edge of the rim and the junction of said neck with said finish which is less than 1¾ but greater than ¾ times the thickness of the finish between said junction and said flat surface, the finish projecting beyond said neck a distance at least 1¾ but no greater than 4 times the thickness of the neck, the upper peripheral portion of said finish adjacent said flat surface being of greater diameter than the remainder of the finish to provide a shoulder about the periphery of the finish, and a peripheral upstanding flange on said rim adjacent the outer edge thereof.

WALTER E. BOSCHIN.

REFERENCES CITED

The following references are of record in the file of this patent:

UNITED STATES PATENTS

| Number | Name | Date |
| --- | --- | --- |
| 364,298 | Ripley | June 7, 1887 |
| 438,893 | Lomax | Oct. 21, 1890 |
| 1,032,836 | Jess | July 16, 1912 |
| 1,345,722 | White | July 6, 1920 |
| 1,566,983 | Sheriff | Dec. 22, 1925 |
| 1,603,524 | Dunbar | Oct. 19, 1926 |
| 1,618,747 | Bartlett | Feb. 22, 1927 |
| 2,085,950 | Busch | July 6, 1937 |
| 2,161,255 | Howard | June 6, 1939 |
| 2,212,804 | Wunings | Aug. 27, 1940 |
| 2,280,167 | Soubier | Apr. 21, 1942 |
| 2,359,380 | Ostrom | Oct. 3, 1944 |
| 2,372,227 | Sanford | Mar. 27, 1945 |
| 2,446,226 | Glocker | Aug. 3, 1948 |